(12) United States Patent
Suzuki

(10) Patent No.: US 6,991,014 B2
(45) Date of Patent: Jan. 31, 2006

(54) PNEUMATIC TIRE COMPRISING CAP AND BASE AND SPIRALLY WOUND CORD

(75) Inventor: Kazuya Suzuki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/978,702

(22) Filed: Oct. 18, 2001

(65) Prior Publication Data

US 2002/0079033 A1 Jun. 27, 2002

(30) Foreign Application Priority Data

Oct. 18, 2000 (JP) .............................. 2000-318304
Oct. 20, 2000 (JP) .............................. 2000-321332

(51) Int. Cl.
*B60C 1/00* (2006.01)
*B60C 9/22* (2006.01)
*B60C 11/00* (2006.01)

(52) U.S. Cl. .............................. 152/209.5; 152/209.18; 152/531

(58) Field of Classification Search ............. 152/209.5, 152/531, 209.18
See application file for complete search history.

(56) References Cited

U.S. PATENT DOCUMENTS 3,916,968 A * 11/1975 Masson
4,838,330 A * 6/1989 Takayama et al.
5,046,542 A * 9/1991 Ohta et al.
6,412,532 B1 * 7/2002 Iida et al.

FOREIGN PATENT DOCUMENTS

| EP | 0 662 396 A1 | 7/1995 |
| EP | 790143 | * 8/1997 |
| EP | 1 016 555 A2 | 7/2000 |
| JP | 5-246212 | * 9/1993 |
| JP | 8-332806 | * 12/1996 |
| JP | 11 301209 | 11/1999 |
| WO | WO 00/24596 | * 5/2000 |

* cited by examiner

Primary Examiner—Steven D. Maki
(74) Attorney, Agent, or Firm—Birch, Stewart, Kolasch & Birch

(57) ABSTRACT

A pneumatic tire comprises a tread rubber disposed radially outside a tread reinforcing belt, the tread rubber includes a radially outmost cap tread rubber and a radially inner base tread rubber, wherein the base tread rubber includes a central base tread rubber centered on the tire equator and a side base tread rubber disposed on each side of the central base tread rubber, and the tread rubber having one of the following hardness distributions (a) and (b): (a) the side base tread rubber is hardest in the tread rubber, and the cap tread rubber has a hardness of from 53 to 63 degrees, the central base tread rubber has a hardness of from 45 to 60 degrees, and the side base tread rubber has a hardness of from 65 to 75 degrees; (b) the side base tread rubber is softest in the tread rubber, and the cap tread rubber has a hardness of 60 to 80 degrees, the central base tread rubber has a hardness of from 65 to 75 degrees, and the side base tread rubber has a hardness of from 45 to 60 degrees.

12 Claims, 3 Drawing Sheets

PNEUMATIC TIRE COMPRISING CAP AND BASE AND SPIRALLY WOUND CORD

The present invention relates to a pneumatic tire, more particularly to an improved internal tread structure including a tread rubber having a specific hardness distribution.

In recent years, from a point of view of environmental conservation, automobile tires are strongly required to reduce the rolling resistance to decrease the fuel consumption.

Hitherto, in order to reduce the rolling resistance of a pneumatic tire, the tread rubber is provided with a two-layered structure in which the hardness of the radially outer layer is increased more than the radially inner layer. In this tread structure, however, there is a tendency to decrease the steering stability during cornering, and it is difficult to improve the high-speed durability and high-speed grip performance so as to satisfy the recent severe requirements.

It is therefore, an object of the present invention to provide a pneumatic tire, in which not only the rolling resistance but also other tire performance such as steering stability, high-speed durability, grip performance, ride comfort and the like are improved.

According to the present invention, a pneumatic tire comprises
   a tread portion with a tread face,
   a pair of sidewall portions,
   a pair of bead portions,
   a carcass extending between the bead portions,
   a belt made of cords disposed radially outside the carcass in the tread portion,
   a tread rubber disposed radially outside the belt and having a multi-layered structure including a radially outmost cap tread rubber defining said tread face and a base tread rubber disposed radially inside the cap tread rubber, said base tread rubber including a central base tread rubber centered on the tire equator and a side base tread rubber disposed on each side of the central base tread rubber so as to extend from a position axially inwards to a position axially outwards of an axial edge of the belt,
   the tread rubber having one of the following hardness distributions (a) and (b):
(a) the side base tread rubber being hardest in the tread rubber, and the cap tread rubber having a hardness of from 53 to 63 degrees, the central base tread rubber having a hardness of from 45 to 60 degrees, and the side base tread rubber having a hardness of from 65 to 75 degrees;
(b) the side base tread rubber being softest in the tread rubber, and the cap tread rubber having a hardness of 60 to 80 degrees, the central base tread rubber having a hardness of from 65 to 75 degrees, and the side base tread rubber having a hardness of from 45 to 60 degrees, wherein the hardness is measured with a type-A durometer according to Japanese Industrial Standard K6253.

Embodiments of the present invention will now be described in detail in conjunction with the accompanying drawings.

Figure 1:
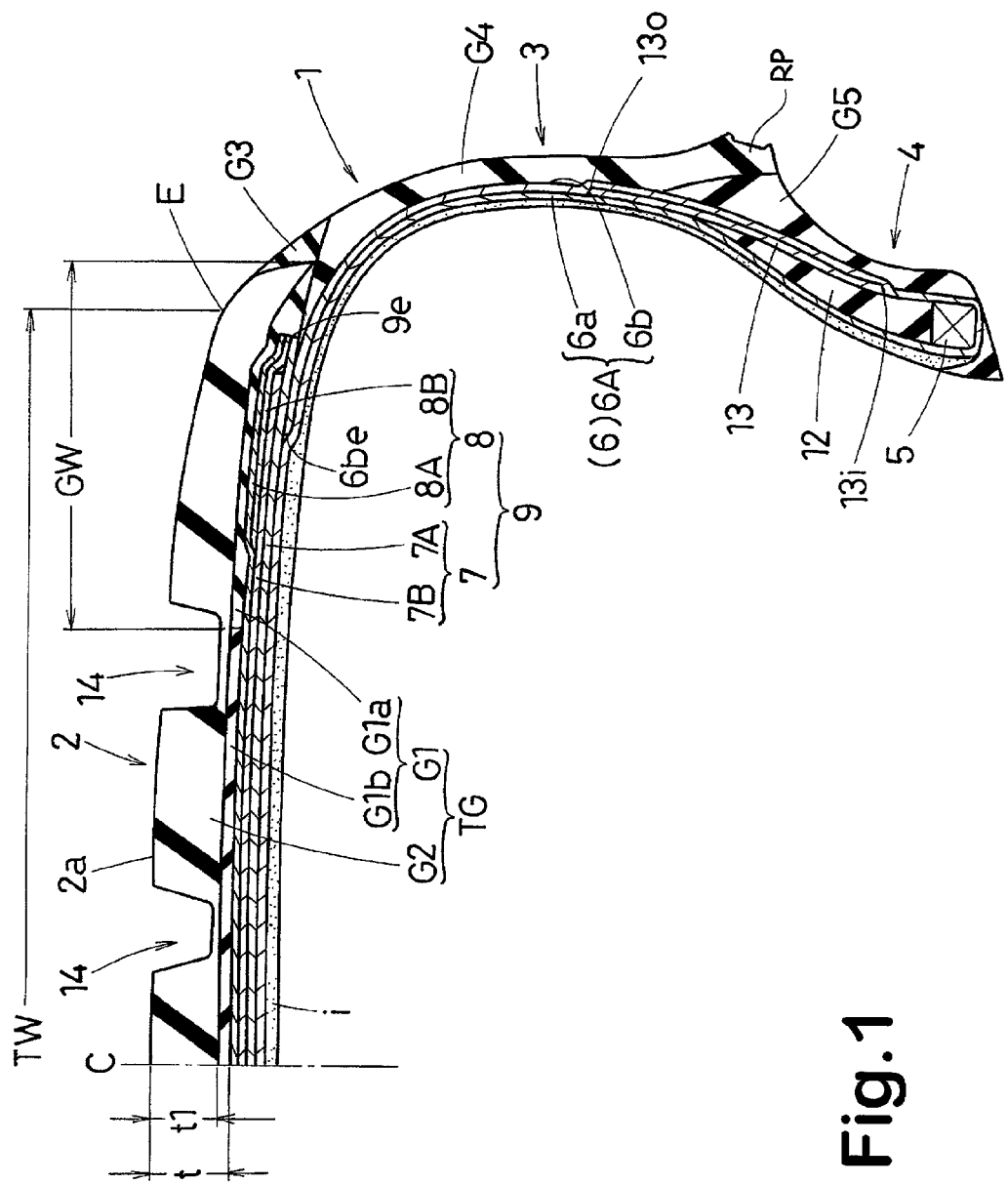
FIG. 1 is a cross sectional view of a pneumatic tire according to the present invention.

In the drawings, pneumatic tire 1 according to the present invention comprises a tread portion 2, a pair of sidewall portions 3, a pair of bead portions 4 each with a bead core 5 therein, a carcass 6 extending between the bead portions 4, and a tread reinforcing belt 9 disposed radially outside the carcass 6 in the tread portion 2.

The tire 1 shown in FIG. 1 is a passenger car tire having an aspect ratio of not more than less than 60%. Here, the aspect ratio is measured under a normally inflated unloaded state. The normally inflated unloaded state is such that the tire is mounted on a standard rim and inflated to a standard load but loaded with no tire load. The undermentioned tread width TW is the maximum axial width between the edges E (hereinafter the "tread edge") of the ground contacting area under a standard loaded condition in which the tire is mounted on the standard rim and inflated to the standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The carcass 6 comprises at least one ply 6A of cords arranged radially at an angle of 75 to 90 degrees with respect to the tire equator C. The carcass ply 6A extends between the bead portions through the tread portion 2 and sidewall portions 3 and is turned up around the bead core in each bead portion from the inside to the outside of the tire so as to form a pair of turned up portions 6b and a main portion 6a therebetween. For the carcass cords, organic fiber cords, e.g. polyester, nylon, rayon and the like are used. But it is also possible to use steel cords. In this example, the carcass 6 is composed of a single ply 6A of polyester cords arranged at 90 degrees.

The turned up portions 6b of the carcass ply 6A extend radially outwards beyond the maximum section width point of the carcass main into the tread portion 2 and the outer end 6 be of turned up portion 6b is secured between the belt 9 and the carcass main.

The bead portions 4 are each provided between the main portion 6a and turned up portion 6b with a bead apex 12 made of hard rubber extending radially outwards from the radially outside of the bead core 5 and tapering towards its radially outward end. Further, a reinforcing layer 13 is disposed between the bead apex 12 and the turned up portion 6b. The reinforcing layer 13 is made of reinforcing cords arranged an angle of from 15 to 30 degrees with respect to a radial direction. In this example, organic fiber cords similar to the carcass cords are used, but metal cords such as steel cords may be also used. The reinforcing layer 13 in this example extends radially outwardly from the bead portion beyond the radially outer end of the bead apex and it has a radially inner end 13i near the axially outside of the bead core 5 and a radially outer end 13o at a radial height in a range of from 40 to 60% of the tire section height.

The belt 9 is composed of a breaker 7 and optionally a band 8.

The breaker 7 is disposed radially outside the carcass crown portion, and it is composed of at least two cross plies, a radially inner ply 7A and a radially outer ply 7B, each made of cords laid parallel with each other at an angle of from 10 to 45 degrees with respect to the tire equator. The inner ply 7A is slightly wider in the axial width than the outer ply 7B. In the belt plies 7A and 7B, steel cords are used in this example, but it is also possible to use high elastic modulus organic fiber cords such as aramid, rayon and the like.

Figure 2A:
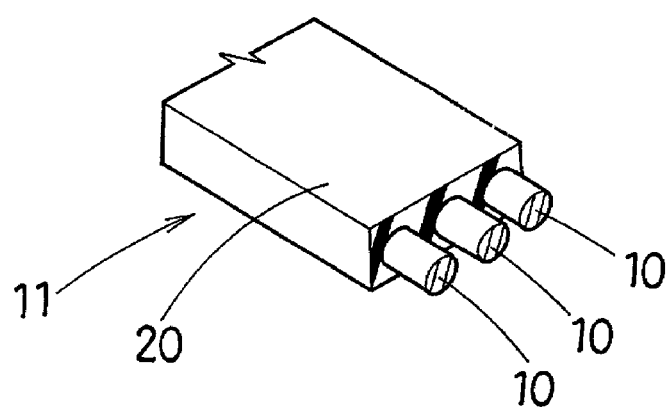
FIGS. 2A and 2B show band cords.
Figure 2B:
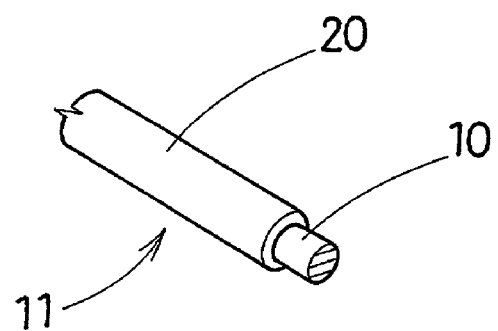

The band 8 is disposed on the radially outside of the breaker 7 and it is formed by spirally winding one to several organic fiber cords 10 so that the cord angle becomes less than 10 degrees, usually less than 5 degrees with respect to the tire equator. In case of a plurality of band cords 10 being wound together, as shown in FIG. 2A, the cords 10 arranged side by side in a parallel relationship are embedded in a topping rubber compound 20 in a form of long tape 11 having a width of from 5 to 15 mm. And the tape 11 is spirally wound. In case of a single band cord 10, the cord 10 is also embedded in a topping rubber compound 20 in a form of long tape 11. But, if it is necessary to closely wind the band cord, as shown in FIG. 2B, the band cord 10 may be embedded in the topping rubber compound 20 in a round shape. In the example shown in FIG. 1, the band 8 extends across the overall width of the breaker 7 and it is doubled only in the edge portions. In the remaining central portion, it is of a single layer. Thus, the band 8 in this example may be said as being made up of a full-width band ply 8A and a pair of axially spaced edge band plies 8B. In this example, the edge band plies 8B are positioned radially inside the full-width band ply 8A. But their positions may be reversed.

On the inside of the carcass 6, an inner liner (i) made of a gas-impermeable rubber is disposed, defining the inner surface of the tire. On the outside of the carcass 6, a tread rubber TG, sidewall rubber G4 and bead rubber G5 are disposed, defining the outer surface of the tire. The bead rubber G5 is disposed axially outside the carcass 6 and extends from the bead base to a position axially inside an axially outwardly protruding rim protector RP. The sidewall rubber G4 is disposed axially outside the carcass 6 and is spliced with the bead rubber G5 inside the rim protector RP. The tread rubber TG is disposed radially outside the belt 9. Further, on each side of the tread rubber TG, a wing rubber G3 having a substantially triangular cross sectional shape is disposed to connect the tread rubber Tg and sidewall rubber G4.

The tread rubber TG includes a base tread rubber G1 disposed radially outside the belt 9, and a cap tread rubber G2 disposed radially outside the base tread rubber G1 to define the tread face 2a.

The cap tread rubber G2 has a thickness greater than the maximum depth of tread grooves 14. On the outer face of the tire, the cap tread rubber G2 extends axially outwardly beyond the tread edges E to the wing rubber G3. Under the cap tread rubber G2, the base tread rubber G1 extends axially outwardly beyond the axial edges of the belt 9 to the wing rubber G3.

The base tread rubber G1 is made up of a side base tread rubber G1a disposed on each side of the tire equator C so as to extend from a position axially inwards of the edge 9e of the belt 9 to a position axially outwards of the edge 9e, and a central base tread rubber G1b extending between the side base tread rubbers G1a and centered on the tire equator C. In the example shown in FIG. 1, the side base tread rubber G1a extends from a position axially inwards to a position axially outwards of the band ply 8B, covering the overall width the band ply 8B.

Embodiment 1

According to one aspect of the present invention, the above-mentioned side base tread rubber G1a is hardest in the tread rubber TG.

The following arrangement is provided for the purpose of improving the steering stability and ride comfort as well as the rolling resistance.

The cap tread rubber G2 has a substantially constant thickness except for the grooved part 14, and when measured at the tire equator C, the thickness t1 of the cap tread rubber G2 is in a range of from 0.50 to 0.95 times, preferably 0.70 to 0.90 times the overall thickness t of the tread rubber TG.

The hardness of the cap tread rubber G2 is set in a range of from 53 to 63 degrees, preferably 55 to 61 degrees.

The central base tread rubber G1b has a substantially constant thickness.

The hardness of the central base tread rubber G1b is set in a range of from 45 to 60 degrees, preferably 45 to 55 degrees, more preferably 50 to 55 degrees.

The side base tread rubber G1a has an axial width GW in a range of from 8 to 40%, preferably 10 to 30%, more preferably 15 to 25% of the tread width TW.

The hardness of the side base tread rubber G1a is set in a range of from 65 to 75 degrees, preferably 68 to 75 degrees, more preferably 68 to 73 degrees.

Thus, the side base tread rubber G1a is harder than the central base tread rubber G1b.

The cap tread rubber G2 and the central base tread rubber G1b may be the same hardness. However, it is preferable that the hardness of the central base tread rubber G1b is less than the hardness of the cap tread rubber G2, and the difference therebetween is in a range of from 3 to 10 degrees. By setting the difference in this range, the ride comfort may be improved without deteriorating the rolling resistance.

In the above-explained arrangement, as the hardest side base tread rubber G1a is disposed in the tread shoulder portion which is subjected to a large lateral force during cornering, the side force increases and thereby the cornering performance can be improved. Further, the steering stability is also improved for the same reason. In the tread crown which is subjected to a relatively large ground pressure during straight running, as the relatively soft central base tread rubber G1b is present, a shock absorbing power is provided and a reduced rolling resistance may be obtained, while maintaining the ride comfort.

If the thickness ratio t1/t is less than 0.50, the tread wear life is shortened. If the thickness ratio t1/t is more than 0.95, it is difficult to improve the fuel consumption performance.

If the hardness of the cap tread rubber G2 is less than 53 degrees, the steering stability, braking performance and wear resistance are liable to deteriorate. If the hardness of the cap tread rubber G2 is more than 63 degrees, ride comfort and running noise become worse.

If the hardness of the central base tread rubber G1b is less than 45 degrees, it becomes difficult to decrease the rolling resistance because of the increased internal friction. If the hardness of the central base tread rubber G1b is more than 60 degrees, the ride comfort becomes worse.

If the hardness of the side base tread rubber G1a is less than 65 degrees, it becomes difficult to improve the steering stability. If the hardness of the side base tread rubber G1a is more than 75 degrees, the ride comfort is liable to become worse.

The passenger car tire 1 in this embodiment has an aspect ratio of not more than less than 60%.

Comparison Test 1

Test tires of size 185/60R14 (wheel rim size: 5.5JX14) for passenger cars having the structure shown in FIG. 1 were made and tested for the rolling resistance, ride comfort and steering stability.

Rolling resistance test: Using a tire tester with a 1706.6 mm dia. 500 mm width drum, the rolling resistance was measured under an inner pressure of 200 kPa, a speed of 80 km/hr and a tire load of 400 kN, and indicated in Table 1 by an index base on Ref.A1 tire being 100, wherein the smaller the index number, the smaller the rolling resistance.

Ride comfort and Steering stability test: The ride comfort and steering stability were evaluated into ten ranks by the test driver during running a 1500 cc FF-type Japanese passenger car provided on all the wheels with test tires (pressure: 200 kPa) on a dry asphalt road in a test course. The higher the rank number, the better the performance.

high-speed durability and grip performance can be improved while improving the rolling resistance.

If the thickness ratio t1/t is less than 0.50, the tread wear life is shortened. If the thickness ratio t1/t is more than 0.95, the grip performance during high speed running is liable to deteriorate.

If the hardness of the cap tread rubber G2 is less than 60 degrees, the rigidity of the tread face 2a becomes insufficient for high speed running, and the deformation of the cap tread rubber G2 increases. As a result, the grip performance deteriorates, and the rolling resistance increases due to the

TABLE 1

| Tire | Ref. A1 | Ref. A2 | Ref. A3 | Ref. A4 | Ex. A1 | Ex. A2 | Ex. A3 | Ex. A4 | Ex. A5 | Ex. A6 |
|---|---|---|---|---|---|---|---|---|---|---|
| Tread rubber Hardness (deg.) | *1 | *2 | *2 | | | | | | | |
| Cap tread rubber | 58 | 58 | 58 | 58 | 58 | 58 | 58 | 58 | 58 | 58 |
| Central base tread rubber | — | 55 | 60 | 55 | 55 | 55 | 55 | 55 | 55 | 55 |
| Side base tread rubber | — | — | — | 80 | 65 | 70 | 75 | 70 | 70 | 70 |
| t1/t | — | 0.8 | 0.8 | 0.8 | 0.8 | 0.8 | 0.8 | 0.8 | 0.8 | 0.8 |
| GW/TW | — | — | — | 0.3 | 0.3 | 0.3 | 0.3 | 0.1 | 0.45 | 0.2 |
| Rolling resistance | 100 | 99 | 101 | 101 | 99 | 99 | 100 | 98 | 102 | 99 |
| Ride comfort | 5 | 6 | 4.5 | 5 | 6 | 6 | 5.5 | 6.5 | 5 | 6.5 |
| Steering stability | 5 | 4.5 | 5.5 | 7 | 6 | 6.5 | 7 | 5.5 | 7 | 6 |

*1 The tread rubber was made of one kind of rubber compound.
*2 The cap tread rubber and the base tread rubber were each made of one kinds of rubber compound.

Embodiment 2

According to another aspect of the present invention, the above-mentioned side base tread rubber G1a is softest in the tread rubber TG contrary to the former Embodiment 1.

The following arrangement is provided for the purpose of improving the high-speed durability and high-speed road grip as well as the rolling resistance.

The cap tread rubber G2 has a substantially constant thickness except for the grooved part 14, and when measured at the tire equator C, the thickness t1 is in a range of from 0.95 to 0.50 times, preferably 0.90 to 0.70 times the overall thickness t of the tread rubber TG.

The hardness of the cap tread rubber G2 is set in a range of from 60 to 80 degrees, preferably 64 to 80 degrees, more preferably 68 to 75 degrees.

The hardness of the central base tread rubber G1b is set in a range of from 65 to 75 degrees, preferably 68 to 73 degrees.

The side base tread rubber G1a has an axial width GW in a range of from 8 to 40%, preferably 10 to 30%, more preferably 15 to 25% of the tread width TW.

The hardness of the side base tread rubber G1a is set in a range of from 45 to 60 degrees, preferably 50 to 55 degrees.

Thus, the side base tread rubber G1a is softer than the central base tread rubber G1b.

The cap tread rubber G2 and central base tread rubber G1b may be the same hardness. However, it is preferable that the hardness of the central base tread rubber G1b is less than the hardness of the cap tread rubber G2, and the difference therebetween is not more than 5 degrees. By setting the difference in this range, the high-speed durability may be further improved.

In the above-explained arrangement, the tread central portion is prevented from bulging out due to the centrifugal force during high speed running, and the internal energy loss of the base tread rubber G1 decreases. As a result, the increased heat generation. If the hardness of the cap tread rubber G2 is more than 80 degrees, the ride comfort greatly deteriorates.

If the hardness of the side base tread rubber G1a is less than 45 degrees, the boundary between the side base tread rubber G1a and cap tread rubber G2 becomes weak. If the hardness of the side base tread rubber G1a is more than 45 degrees, the ride comfort greatly deteriorates.

If the hardness of the central base tread rubber G1b is less than 65 degrees, the heat generation increases and the high-speed durability decreases. If the hardness of the central base tread rubber G1b is more than 75 degrees, as the ground pressure increases in the central part of the cap tread rubber G2, the resistance to tread wear decreases.

In this embodiment, the passenger car tire 1 has an aspect ratio of not more than less than 50%.

Comparison Test 2

Test tires of size 225/50R16 (wheel rim size: 7JX16) for passenger cars having the structure shown in FIG. 1 were made and tested for the rolling resistance, ride comfort and steering stability.

Rolling resistance test: Same as above

Ride comfort and Grip performance test: Using a 2500 cc FR-type Japanese passenger car provided on all the four wheels with test tires (pressure 250 kPa), high speed straight running and high speed cornering were measured on the dry asphalt road in the test course and the road grip and ride comfort were evaluated into ten ranks by the test driver. The higher the rank number, the better the performance.

High-speed durability test: The high-speed durability was tested according to the ECE30 Step speed test, S-range (180 km/h/20 minutes) and H-range (200 km/h/20 minutes). (pressure 200 kPa) The test results are indicated by an index based on Ref. 1 being 100, wherein the larger the index number, the better the durability.

TABLE 2

| Tire | Ref. B1 | Ref. B2 | Ref. B3 | Ref. B4 | Ex. B1 | Ex. B2 | Ex. B3 | Ex. B4 | Ex. B5 | Ex. B6 |
|---|---|---|---|---|---|---|---|---|---|---|
| Tread rubber Hardness (deg.) | *1 | *2 | | | | | | | | |
| Cap tread rubber | 75 | 75 | 75 | 75 | 75 | 75 | 75 | 75 | 75 | 85 |
| Central base tread rubber | — | 70 | 70 | 70 | 70 | 70 | 70 | 60 | 75 | 60 |
| Side base tread rubber | — | — | 65 | 40 | 45 | 50 | 50 | 60 | 50 | 50 |
| t1/t | — | 0.8 | 0.8 | 0.8 | 0.8 | 0.8 | 0.8 | 0.8 | 0.8 | 0.8 |
| GW/TW | — | — | 0.3 | 0.3 | 0.3 | 0.3 | 0.3 | 0.3 | 0.3 | 0.3 |
| Rolling resistance | 100 | 98 | 96 | 92 | 93 | 94 | 95 | 93 | 98 | 99 |
| Grip performance | 6 | 6 | 6 | 5 | 5.5 | 6 | 6 | 5 | 6.5 | 6.5 |
| Ride comfort | 6 | 6 | 6 | 7 | 7 | 6 | 6 | 6.5 | 5.5 | 5.5 |
| Durability | 100 | 100 | 100 | 98 | 99 | 100 | 100 | 97 | 101 | 96 |

*1 The tread rubber was made of one kind of rubber compound.
*2 The cap tread rubber and the base tread rubber were each made of one kinds of rubber compound.

Figure 3:
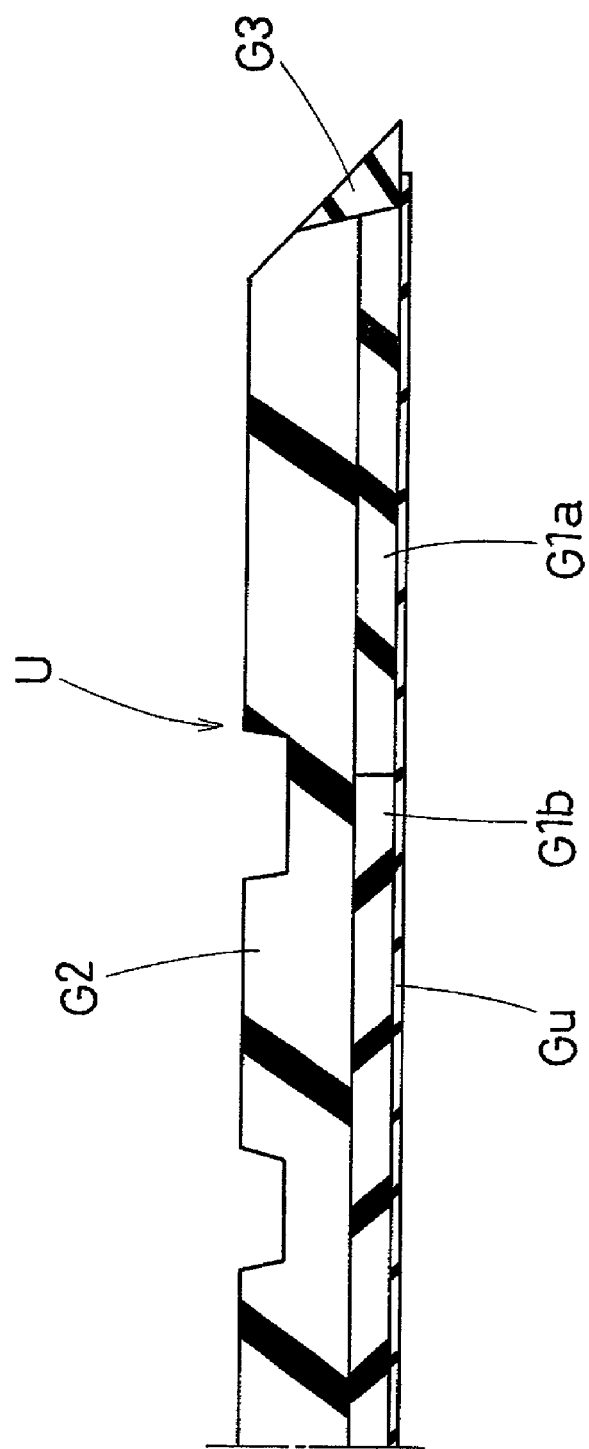
FIG. 3 is a cross sectional view of an extruded unvulcanized tread rubber.

FIG. 3 shows an example of the unvulcanized tread rubber TG. In this example, the unvulcanized cap tread rubber G2, central base tread rubber G1b, side base tread rubber G1a, and wing rubber part G4 and a sheet of rubber Gu are assembled as shown in FIG. 3 and applied to the belt 9 in a tire building process. The sheet of rubber Gu is disposed between the base tread rubber G1 and the belt 9 to improve the bonding strength therebetween. The unvulcanized central base tread rubber G1b and side base tread rubber G1a have a substantially constant thickness. On the surface of the cap tread rubber G2, hollows are formed at positions corresponding to circumferentially extending tread grooves, but otherwise the thickness is substantially constant. The unvulcanized cap tread rubber G2, central base tread rubber G1b, side base tread rubber G1a and wing rubber part G4 may be formed by means of a multi-head extruder. A sheet of rubber Gu may be formed by means of rolling.

What is claimed is:

1. A pneumatic tire comprising
a tread portion with a tread face and a tread width the tread portion including a grooved portion,
a pair of sidewall portions, a pair of bead portions, a carcass extending between the bead portions,
a belt made of cords disposed radially outside the carcass in the tread portion,
a tread rubber disposed radially outside the belt and including a cap tread rubber defining said tread face and a base tread rubber disposed radially inside the cap tread rubber,
said base tread rubber including a central base tread rubber centered on the tire equator and a side base tread rubber disposed on each side of the central base tread rubber so as to extend from a position axially inwards to a position axially outwards of an axial edge of the belt,
the tread rubber having the following hardness distribution:
the cap tread rubber having a hardness of from 53 to 63 degrees, the central base tread rubber having a hardness of from 45 to 60 degrees, and the side base tread rubber having a hardness of from 65 to 75 degrees;
wherein the hardness is measured with a type-A durometer according to Japanese Industrial Standard K6253,
said belt including a band formed by spirally winding at least one cord at a small angle with respect to the tire equator, the band comprising a pair of axially spaced edge band plies,
said side base tread rubber extending on the radially outside of the belt from a position axially inward of one of the edge band plies to a position axially outward of the edge band ply, while covering the entire width of the edge band ply, wherein
the central base tread rubber has a substantially constant thickness,
the thickness of the central base tread rubber is substantially the same as the thickness of the side base tread rubber at a boundary between the central base rubber and the side base tread rubber, and
the cap tread rubber has a substantially constant thickness except for the grooved portion, and when measured at the tire equator, the thickness of the cap tread rubber is in a range of from 0.70 to 0.90 times the overall thickness of the tread rubber.

2. The pneumatic tire according to claim 1, wherein the hardness of the central base tread rubber is less than the hardness of the cap tread rubber.

3. The pneumatic tire according to claim 1, wherein the side base tread rubber has an axial width in a range of from 8 to 40% of the tread width.

4. The pneumatic tire according to claim 1, wherein said side base tread rubber has an axial width in a range of from 8 to 40% of the tread width.

5. The pneumatic tire according to claim 1, wherein said side base tread rubber has an axial width in a range of from 10 to 30% of the tread width.

6. The pneumatic tire according to claim 1, wherein said side base tread rubber has an axial width in a range of from 15 to 25% of tread width.

7. The pneumatic tire according to claim 1, wherein said belt includes a breaker, the breaker comprising at least two cross plies each made of cords laid parallel with each other at an angle of from 10 to 45 degrees with respect to the tire equator, and said band is disposed on the radially outside of the breaker.

8. The pneumatic tire according to claim 1, wherein said band comprises a full-width band ply.

9. The pneumatic tire according to claim 1, wherein said band comprises a full-width band ply on the radially inside the edge band plies.

10. The pneumatic tire according to claim 1, wherein said band comprises a full-width band ply on the radially outside the edge band plies.

11. The pneumatic tire according to claim 1, wherein said at least one cord of said band is spirally wound at an angle of less than 10 degrees with respect to the tire equator.

12. The pneumatic tire according to claim 1, wherein said at least one cord of said band is spirally wound at an angle of less than 5 degrees with respect to the tire equator.

* * * * *